United States Patent [19]

Speggiorin

[11] Patent Number: 5,589,903
[45] Date of Patent: Dec. 31, 1996

[54] PANORAMA HEAD FOR OPTICAL EQUIPMENT PARTICULARLY FOR PHOTOGRAPHIC EQUIPMENT

[75] Inventor: Paolo Speggiorin, Mussolente, Italy

[73] Assignee: Lino Manfrotto & Co., S.p.A., Bassano Del Grappa, Italy

[21] Appl. No.: 442,533

[22] Filed: May 16, 1995

[30] Foreign Application Priority Data

Jul. 20, 1994 [IT] Italy .................................. PD94A0135

[51] Int. Cl.$^6$ ................................................. G03B 17/00
[52] U.S. Cl. ............................ 396/428; 248/663; 248/664
[58] Field of Search ....................... 354/81, 293; 248/663, 248/667; 403/52, 72, 73, 74; 211/53; 359/368, 370

[56] References Cited

U.S. PATENT DOCUMENTS

| | | | |
|---|---|---|---|
| 3,118,695 | 4/1960 | Engelhardt | 287/54 |
| 4,451,020 | 5/1984 | Posso | 248/183 |
| 4,905,030 | 2/1990 | Corrales | 354/82 |
| 5,347,740 | 9/1994 | Rather et al. | 42/94 |
| 5,365,293 | 11/1994 | Nakatani | 354/81 |
| 5,397,086 | 3/1995 | Chen | 248/183 |

*Primary Examiner*—Howard B. Blankenship
*Assistant Examiner*—Christopher E. Mahoney
*Attorney, Agent, or Firm*—Sughrue, Mion, Zinn, Macpeak & Seas

[57] ABSTRACT

A panorama head for positioning optical equipment precisely relative to a system of axes comprises an articulated joint for each axis, each articulated joint including first and second joint elements which are coupled with one another for rotation about the corresponding axis and can be clamped selectively in the preselected relative angular position; each articulated joint comprises a kinematic reduction coupling with first and second coupling elements which are fixed to the first and second joint elements, respectively, during rotation about the corresponding axis and are movable between a position of mutual coupling for precision adjustments and a position of mutual disengagement for quick positioning.

14 Claims, 2 Drawing Sheets

PANORAMA HEAD FOR OPTICAL EQUIPMENT PARTICULARLY FOR PHOTOGRAPHIC EQUIPMENT

BACKGROUND OF THE INVENTION

The present invention relates to a panorama head for optical equipment, particularly for photographic equipment, for the positioning of the equipment precisely relative to a system of axes, of the type comprising an articulated joint for each axis, each articulated joint including first and second joint elements which are coupled with one another for rotation about the corresponding axis and can be clamped selectively in the preselected relative angular position.

Panorama heads of the type indicated are used, in combination with tripods or other supports, in the field of optical equipment and, particularly in the specific field of photographic equipment, for supporting such equipment in an orientable manner.

In this field, a need has arisen for a panorama head having adjustable articulated joints for carrying out precise positioning quickly.

When it is preferred to give the speed of positioning of the equipment precedence over precision, heads controlled by means of levers, knobs or similar devices which serve both for rotating the joint about the respective axis and for clamping the two joint elements relative to one another are used.

When it is preferred to give precedence to more precise positioning, however, micrometric positioning heads are usually used, in which the relative rotation between the joint elements is achieved by means of permanently-engaged worm-screw reduction gears.

Heads of this latter type fulfil the need for very precise positioning but have the disadvantage of not permitting quick positioning.

The problem upon which the invention is based is that of providing a panorama head having a structure and design such as to overcome all the disadvantages complained of with reference to the prior art cited.

SUMMARY OF THE INVENTION

This problem is solved by the invention by means of a panorama head of the type indicated, characterized in that at least one of the articulated joints comprises a kinematic reduction coupling with first and second coupling elements which are fixed to the first and second joint elements, respectively, during rotation about the corresponding axis and can be moved between a position of mutual coupling for precision adjustments and a position of mutual disengagement for quick positioning.

BRIEF DESCRIPTION OF THE DRAWINGS

The characteristics and advantages of the invention will become clearer from the following detailed description of a preferred embodiment thereof, described by way of non-limiting example with reference to the appended drawings, in which.

DETAILED DESCRIPTION OF THE INVENTION

Figure 1:
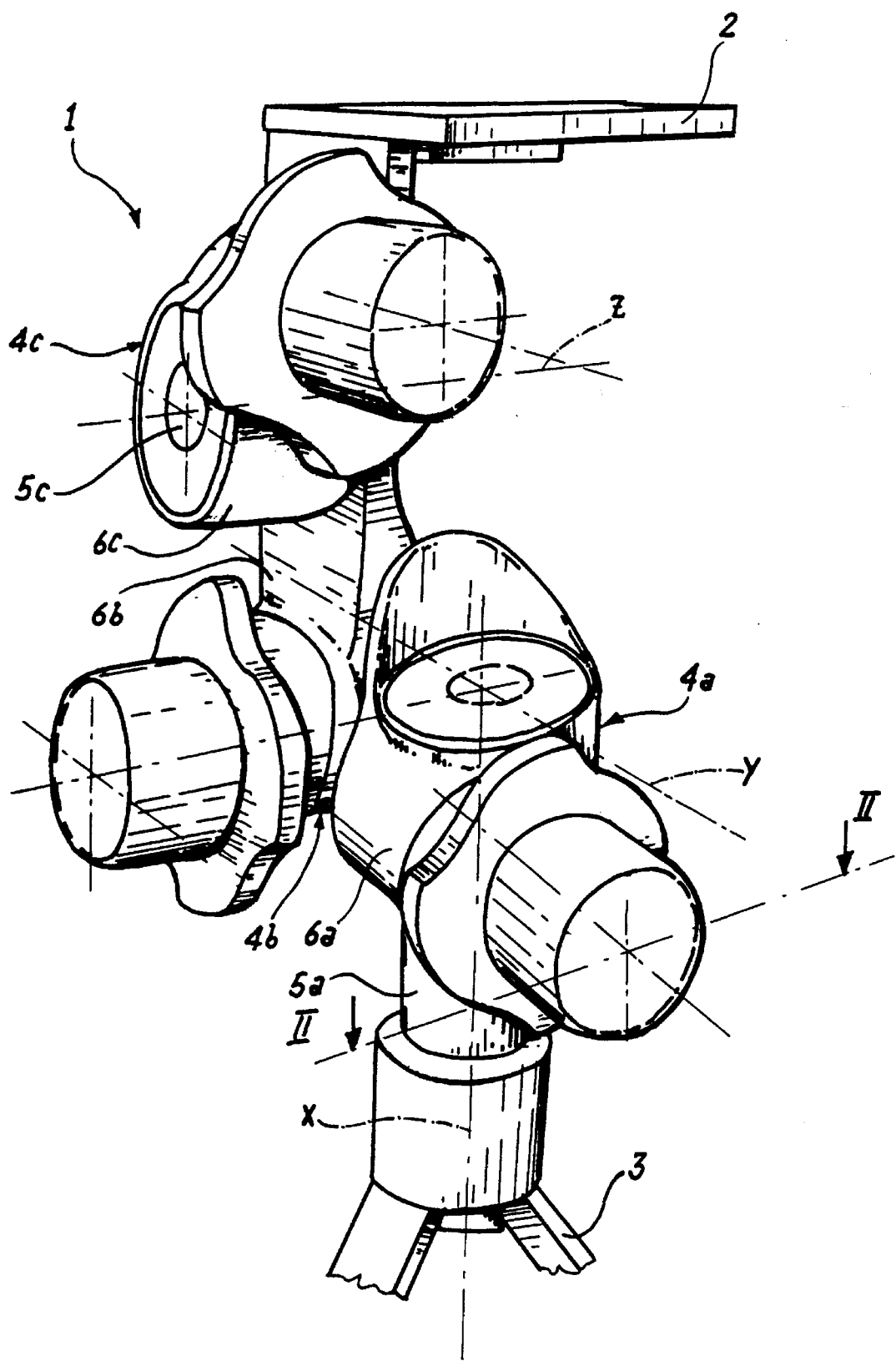
FIG. 1 is a perspective view of a panorama head produced in accordance with the present invention.

In FIG. 1, a panorama head, generally indicated 1, serves for the orientation in space, relative to a tripod or other support, generally indicated 3, of a plate 2 for supporting optical and photographic equipment.

The head 1 comprises three articulated joints 4a, 4b and 4c, each articulated joint comprising a respective first joint element 5a, 5b, 5c and a respective second joint element 6a, 6b, 6c, coupled to one another for rotation about a respective axis X, Y, or Z. The axes X, Y, Z are perpendicular to one another and define a system of axes relative to which the plate 2 can be oriented.

Only the articulated joint 4a will be described in detail below, it being understood that the same distinguishing features are present in a structurally identical manner in the articulated joints 4b and 4c.

The first joint element 5a comprises a shaft 7 (shown only in FIG. 3) on the free end of which a sleeve 8 is fitted coaxially and is fixed for rotation therewith. The sleeve 8 is closed at one of its ends by a wall 9 in which there is an axial through-hole 10. The shaft 7 is held in abutment against the wall 9 by a screw, not shown, engaged in the hole 10 and screwed into a corresponding axial threaded hole in the shaft 7.

In the region of the wall 9, a shoulder 11 extending radially outwardly from the sleeve 8 abuts a step 12 of a shell 13 constituting the second joint element 6a.

The shell 13 has annular surfaces 14a, 14b by which it is coupled rotatably with the sleeve 8.

A kinematic reduction coupling provided between the sleeve 8 and the shell 13 comprises first and second coupling elements.

The first coupling element comprises a gear 17 coaxial with the sleeve 8 and formed by external teeth thereof.

The second coupling element comprises a worm screw 18 which is meshed with the gear 17 so as to constitute therewith a worm-screw reduction gear generally indicated 19.

Owing to its nature, the reduction gear 19 is non-reversible, that is, relative rotation between the worm screw 18 and the gear 17 takes place only by the rotation of the worm screw 18. Rotation of the shaft 7, which constitutes the driven shaft of the reduction gear, on the other hand, locks the worm screw 18 and the gear 17 preventing rotation of the driven shaft 7.

The worm screw 18 comprises a threaded portion 20, an operating appendage 21 and a shank 22 which are coaxial with one another on an axis K.

It is supported on the shell 13 by means of a bush 23 of plastics material which is rotatable about an axis L. The bush 23 has an external thread 24 screwed into a threaded seat 25 in the shell 13 and has a lobed operating appendage 26 having a through-hole 27 on the axis K which is parallel to and spaced from the axis L with a disalignment the extent of which is indicated A.

It will be seen that the threaded coupling between the bush 23 and the seat 25 enables the bush to be restrained axially in the seat, except for small movements due to the thread, whilst permitting the bush to rotate relative to the shell 13.

The shank 22 of the worm screw 18 is supported rotatably in the hole 27 in the bush 23 and is restrained axially in the bush by shoulders 28, 29 of the shank 22 and of the operating appendage 21, respectively.

The worm screw 18 is movable between an operative position of mutual coupling with the gear 17 (FIG. 3) and a non-operative position of mutual disengagement (FIG. 5) opposed by a spring 30.

It will be noted that the relative positioning of the axes K and L is such that, in the operative position, the two axes are substantially equidistant from the axis X of the gear 17. A small angular rotation of the bush 23 thus results in an appreciable movement of the worm screw 18 away from and towards the gear 17, this movement in any case being greater than the movement which would take place if the axes K and L were spaced differently from the axis X, at the limit even being coplanar in a plane perpendicular to the axis X.

The spring 30 acts between the shell 13 and the bush 23. It is fitted on the bush 23 between the thread 24 and the operating appendage 26 and is housed in a seat 31 in the shell 13, its ends being fixed to respective catch projections 33, 34 in the seat 31 and in an annular groove 32 in the operating appendage 26 facing the seat 31, respectively.

Starting from a condition in which the worm screw 18 is in the operative position of mutual coupling with the gear 17 (FIG. 3), rotation of the worm screw 18 about the axis L by means of the operating appendage 21 rotates the shell 13 relative to the driven shaft 7 about the axis X until the preselected angular positioning between the respective first and second joint elements 5a, 6a is achieved.

Figures 2, 3, 4, 5:
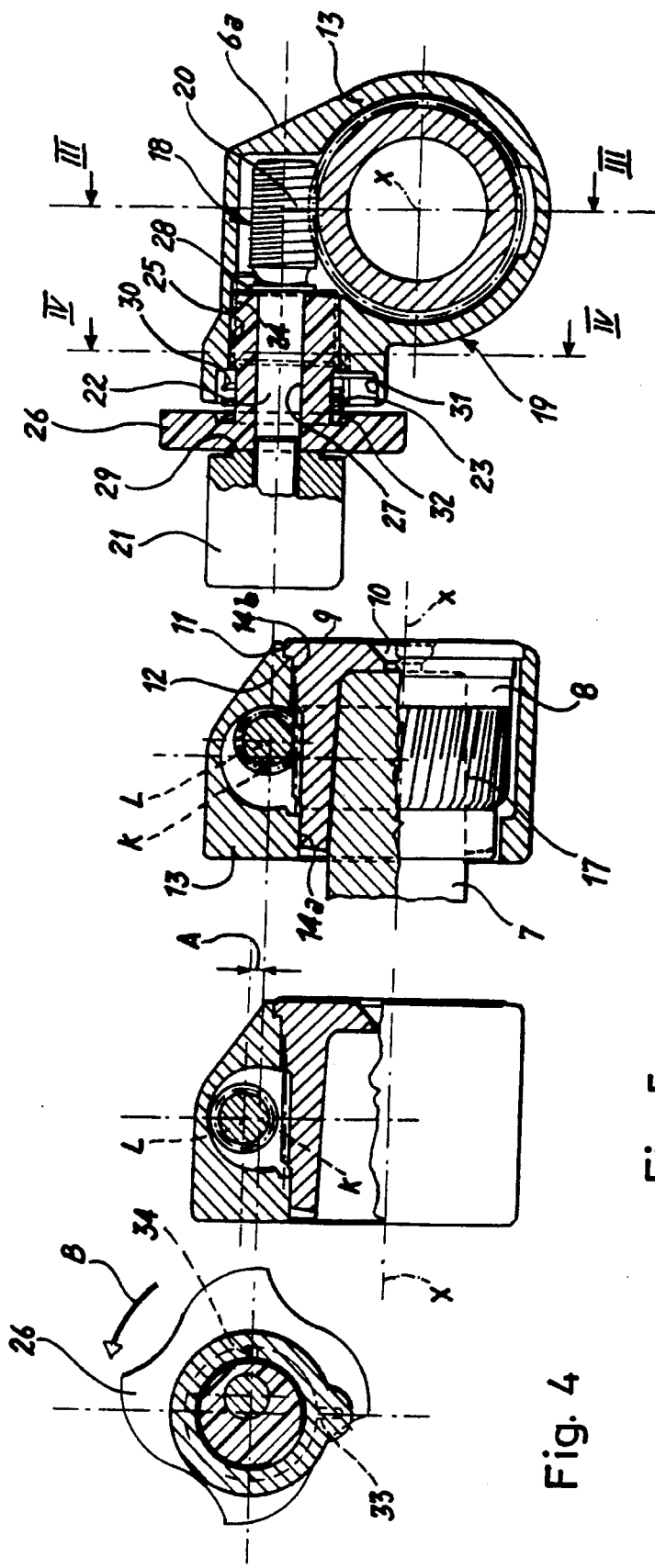
FIG. 2 is a partial longitudinal section of a detail of FIG. 1 taken along the II—II.
FIG. 3 is a section taken on the line III—III of FIG. 2.
FIG. 4 is a section taken on the line IV—IV of FIG. 2.
FIG. 5 is a view corresponding to that of FIG. 3 of the same detail at a different stage of operation.

In order to achieve quick angular positioning between the same joint elements, however, the bush 23 is rotated by the operating appendage 26 in the sense indicated by the arrow B of FIG. 4, so as to move the threaded portion 20 into the inoperative position of FIG. 5. The bush 23 is rotated against the biasing action of the spring 30. When the thread of the worm screw 18 is disengaged from the teeth of the gear 17, the joint elements 5a, 6a are free to rotate relative to the axis X and can be rotated with considerable speed.

Once the desired angular position between the respective joint elements 5a, 6a is reached, upon the release of the operating appendage 26, the resilient action of the spring 30 brings the worm screw 18 back to the operative position in engagement with the gear 17.

The invention thus solves the problem posed, achieving many advantages in comparison with known solutions.

A first advantage is that of allowing the operator to carry out precise positioning quickly by acting on both of the operating appendages with the same hand so as to leave the other hand free for other activities.

Moreover, the provision of a spring urging the worm screw into the mutual coupling position, enables the play between the gear and the worm screw to be taken up continuously.

Furthermore, the thread of the bush enables it to be restrained axially in the shell of the reduction gear in two directions.

Not least is the advantage that, because the bush is of plastics material, it can be worked easily and the thread adapts automatically to the threaded seat of the shell of the reduction gear with large working tolerances.

What is claimed is:

1. A panorama head for optical equipment, particularly for photographic equipment, for positioning the equipment precisely relative to a system of axes, comprising an articulated joint for each axis, each articulated joint including first and second joint elements which are coupled with one another for rotation about the corresponding axis and can be clamped selectively in a preselected angular position relative to said corresponding axis, characterized in that wherein at least one of the articulated joints comprises a kinematic reduction coupling with first and second coupling elements which are fixed to the first and second joint elements, respectively, during rotation about the corresponding axis and can be moved between a position of mutual coupling for precision adjustments and a position of mutual disengagement for quick positioning.

2. A panorama head according to claim 1, in which the kinematic reduction coupling is non-reversible.

3. A panorama head according to claim 2, in which the kinematic reduction coupling is a worm-screw reduction gear.

4. A panorama head according to claim 3, in which the first joint element comprises a driven shaft and a gear of the reduction gear, the gear constituting the first coupling element, and in which the second joint element comprises a shell and a worm screw of the reduction gear, the worm screw constituting the second coupling element and being meshed with the gear in the position of mutual coupling.

5. A panorama head according to claim 4, in which the worm screw is supported rotatably in the shell with the interposition of means for moving the worm screw relative to the gear between the mutual coupling and disengagement positions.

6. A panorama head according to claim 5, in which the means for moving the worm screw comprises a bush supported in the shell for rotation about a first axis perpendicular to the articulation axis, the worm screw being supported for rotation in the bush about a second axis parallel to and spaced from the first axis.

7. A panorama head according to claim 6, in which the bush is threaded externally and is engaged in a threaded seat of the shell so as to be rotatable in the seat and restrained axially therein.

8. A panorama head according to claim 7, further comprising means for resiliently urging the bush towards the position of mutual coupling between the worm screw and the gear.

9. A panorama head according to claim 6, further comprising means for resiliently urging the bush towards the position of mutual coupling between the worm screw and the gear.

10. A panorama head according to claim 6, in which the bush and the worm screw have respective operating appendages extending outside the shell.

11. A panorama head according to claim 10, in which the operating appendage of the bush is shaped in lobes.

12. A panorama head according to claim 6, in which the bush is of plastics material.

13. A panorama head according to claim 6, in which the first and second axes are substantially equidistant from the articulation axis in the position of mutual coupling.

14. A panorama head according to claim 4, in which the gear is formed on a sleeve structurally independent of the driven shaft and fixed for rotation on one end thereof.

\* \* \* \* \*